Patented Oct. 29, 1946

2,410,281

UNITED STATES PATENT OFFICE 2,410,281

PARASITICIDAL COMPOSITIONS

Fred W. Fletcher and Eugene E. Kenaga, Midland, Mich., assignors to The Dow Chemical Company, Midland, Mich., a corporation of Michigan No Drawing. Application February 25, 1943, Serial No. 477,136

6 Claims. (Cl. 167—31)

This invention is concerned with parasiticidal materials and is particularly directed to a new composition of matter adapted to be applied to living trees during the dormant period.

The control of insect and mite eggs and of scale on trees is generally accomplished by application of spray mixtures to the infested trunk and limbs during the dormant period. Conventional applications of oil and of lime sulfur have not been particularly satisfactory. The high concentration of oil required to obtain commercial control of organisms frequently causes severe injury and is not economically attractive. Lime sulfur solutions and dispersions have poor penetrating properties so that eggs and scale deposited in fissures of the bark are either not contacted by the spray or are not exposed to lethal concentrations of the toxicant.

In an effort to overcome the disadvantages and inadequacies of accepted control methods, it has been proposed to modify the conventional dormant oil sprays by inclusion therein of one or more of a variety of synthetic organic toxicants. While such practices have improved the efficiency of the controls obtained, they have also complicated the problem of tree-injury because of the unpredictable action exerted by many toxicants upon bud and twig development of trees.

The foregoing has been particularly true with respect to the use of phenolic toxicants. Here, the trend has been toward poly-nitro derivatives such as dinitro-cresol, dinitro-phenol, and the like. While these compounds have a measure of toxic effect when applied with oil in ovicidal and other dormant compositions, occasional injury attributable thereto materially limits the scope of their use.

We have discovered that the chloro-mononitro-phenols, their alkyl homologues, cyclohexyl analogues, and salts thereof, are well adapted for use as active toxicants in dormant parasiticidal compositions and particularly in spray mixtures to be applied as ovicides and for the control of scale. The compounds which have been found valuable for this purpose are those having the formula:

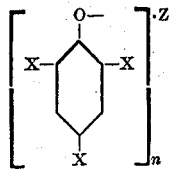

wherein one X represents a nitro radical, another X represents chlorine, the third X represents chlorine, alkyl, cyclohexyl, or hydrogen, Z is hydrogen or a cation of the alkali or alkaline earth metal groupings, and $n$ is an integer equal to the valency of Z.

While the new parasiticidal compositions with which the present invention is concerned may be either sprays or dusts, the preferred method of operation includes the use of the chloro-mononitro-phenolic toxicant as a constituent of a spray composition. The phenolic toxicant may be dissolved in or associated with a dormant oil or other suitable non-corrosive organic liquid, and thereafter emulsified with water to obtain a spray mixture. Where the toxicant is not particularly soluble in the oil, it may be dispersed in finely divided form into a previously prepared oil emulsion composition. In an alternate procedure, the toxicant may be dispersed in and on a finely divided solid carrier to obtain an insecticidal concentrate adapted to be subsequently dispersed in water to serve as the active toxic constituent of an aqueous spray mixture. In the preparation of such concentrate, oil may be employed along with the phenol or phenolate. If the particular phenolic material employed is sufficiently soluble in oil, the carrier may be wet with an oil solution of the toxicant, otherwise the toxicant is first dispersed in the carrier and the dry product thereafter wet with the desired amount of oil. The chloro-mononitro-phenolic toxicants may also be employed simply as aqueous solutions or dispersions, preferably in combination with suitable wetting agents.

When the toxicants are employed as constituents of dusting mixtures, it is generally sufficient that a relatively low percentage of the toxicant be ground with the selected carrier. Other methods of preparation include wetting the carrier with a solution of the toxicant in volatile solvent and thereafter evaporating off the solvent, wetting the carrier with a concentrated solution of the toxicant in a relatively non-volatile oily carrier adapted to remain in the mixture as a sticking agent or adhesive, etc.

The amount of the toxicant employed in the preparation of oil-water emulsion compositions may vary over an appreciable range. Where an oil solution of the phenolic constituent is to be emulsified, from about 1 to 10 per cent of the phenol is first dissolved in the oil. This liquid concentrate is thereafter dispersed in water in such amount as to provide a concentration of from 0.25 to 3 pounds of the chloro-mononitro-phenol per 100 gallons of the ultimate aqueous composition. In the preparation of dust mixtures, from about 0.001 to 100 per cent by weight or more of the toxicant may be incorporated with the carrier depending upon whether or not the product is to be employed without further modification in the dusting of tree and plant surfaces or is to be employed as a concentrate in the preparation of aqueous spray mixtures.

In the preparation of aqueous dispersions, whether by use of the phenol or phenolate per se or by the dispersion of a finely divided dust concentrate, the preferred amount of the active toxicant in the ultimate spray mixture is from about 0.25 to 5.0 pounds per 100 gallons.

The oil employed in combination with the chloro-mononitro-phenols or their salts is preferably a petroleum distillate. However, vegetable, animal, or fish oils, or high-boiling synthetic oily materials such as unsymmetrical-diphenyl-ethane, ortho-dichlorobenzene, tri-chlorobenzene, high-boiling olefines, high-boiling liquid paraffin hydrocarbons, and other relatively non-volatile organic solvents may be employed in accordance with the teaching of the present invention.

Suitable finely divided solid carriers for use in the compositions herein described include volcanic ash, diatomaceous earth, talc, kieselguhr, wood flour, finely divided carbon, gypsum, bentonite, etc. Among the wetting and dispersing agents which may be employed are such oil and/or water soluble materials as sulfonated oils, partially neutralized sulfonated oils, salts of higher alcohol sulfates, blood albumen, soap, casein, glyceryl esters, sulfonated aromatic and aliphatic hydrocarbons and their salts, sulfonated phenols, etc.

Representative of the organisms against which the chloro-mononitro-phenols and their salts have been found particularly effective are San Jose scale, scurfy scale, oyster-shell scale, scab, the spores and mycelia of various over-wintering fungi, and the eggs of such insect and mite pests as aphis, red spider, bud moth, etc.

The following examples illustrate the invention but are not to be construed as limiting:

EXAMPLE 1

A number of monochloro-mononitro-phenols and dichloro-mononitro-phenols were compounded with a light lubricating oil, a suitable emulsifying agent and water to obtain oil-water emulsion compositions adapted to be employed as dormant spray materials for the control of insect and mite eggs, scale, fungus, etc. The particular oil employed was that marketed as "#10224 oil" and had a boiling range of 614°–760° F., a Saybolt viscosity of 113 at 100° F., a U. R. of 68 (according to the California method), and weighed 7.62 pounds per gallon. The emulsifying agent used was that sold under the trade name of Nopco #1216 and consisted essentially of partially neutralized sulfonated sperm oil.

The compounding was carried out in each instance by dissolving a given weight of the particular phenol in 24.6 parts by weight of the lubricating oil and 2.7 parts by weight of the emulsifying agent, and thereafter emulsifying the solution with sufficient water to give 1000 parts by weight of mixture. The given amounts of the phenol compound employed were 1.2 parts by weight to obtain a composition equivalent to one containing one pound of the phenol per 100 gallons of spray, 0.6 part by weight to obtain a composition equivalent to one containing 0.5 pound of phenol per 100 gallons of spray, and 0.3 part by weight to obtain a mixture equivalent to one containing 0.25 pound of phenol per 100 gallons of spray. A control composition consisted of 24.6 parts by weight of the oil and 2.7 parts by weight of the emulsifier dispersed in sufficient water to give 1000 parts by weight of spray. This corresponded to a spray composition comprising three gallons of oil per 100 gallons.

The foregoing spray compositions were employed in a series of determinations to ascertain their comparative efficiencies against the eggs of the milkweed bug, *Oncopeltes fasciatus*. In this operation, 30 eggs of the milkweed bug were deposited on filter paper, the filter paper placed in a Buchner funnel arranged in a suction flask, and the egg mass sprayed with a 20 milliliter portion of the spray composition. The excess of the spray was drawn off by suction and the egg mass thereafter incubated over a period of 5–8 days at 80° F. The number of eggs hatching was then observed and the degree of mortality calculated therefrom. The following table sets forth representative results obtained according to the procedure described. These data are averages obtained in from 2 to 18 determinations with each of the compositions indicated.

Table I

| Compound | Per cent mortality at 1 lb. per 100 gallons | Per cent mortality at 0.5 lb. per 100 gallons | Per cent mortality at 0.25 lb. per 100 gallons |
|---|---|---|---|
| 4-chloro-6-nitro-phenol | 95 | 100 | 73 |
| 2-chloro-4-nitro-phenol | 100 | 90 | 69 |
| 2-chloro-6-nitro-phenol | 100 | 100 | 88 |
| 2,4-dichloro-6-nitro-phenol | 100 | 100 | 80 |
| Control composition (mortality at 3 lbs. per 100 gallons) | 35 | | |

In exactly comparable determinations, the sodium salts of the foregoing phenols were employed in combination with oil, emulsifying agent, and water to obtain results which were the equal of and sometimes superior to those reported above for the free phenols.

In a similar manner mononitro-phenol and representative halo-dinitro-phenols and chlorinated phenols were tested to determine their comparative efficiencies. The following data is representative of the results so obtained.

Table II

| Compound | Per cent mortality at 1 lb. per 100 gallons |
|---|---|
| 4-chloro-2,6-dinitro-phenol | 57 |
| 2-chloro-4,6-dinitro-phenol | 44 |
| 4-nitro-phenol | 51 |
| 2-chloro-phenol | 36 |
| 2,6-dichloro-phenol | 48 |

EXAMPLE 2

Field determinations were carried out with compositions comprising oil in combination with 2,4-dichloro-6-nitro-phenol and with 2,4-dinitro-6-methyl-phenol (dinitro-orthocresol) to ascertain the effect of the indicated phenolic toxicants upon the buds of trees sprayed therewith under dormant conditions. The oil employed was an emulsible type product marketed as "Stanolind Dormant Spray Oil," having a Saybolt viscosity of 85, and weighing 7.28 pounds per gallon. The compounding of the spray materials was carried out by dissolving the nitrophenol in the proper amount of oil and thereafter agitating the solution with water. The amount of oil employed was such as to give an ultimate composition comprising 3 gallons of oil per 100 gallons of spray.

The spray compositions as obtained above were applied to mature apple trees in the early winter. Boughs and twigs were cut from the trees 5 weeks after application of the spray and the buds thereon sectioned and examined to determine the extent of injury, if any, resulting from the treatment with the spray compositions. It was found that a spray containing 3 gallons of the dormant spray oil and 4 ounces of dinitrocresol per 100 gallons, killed 13.5 per cent of the buds. A spray containing 3 gallons of the oil and 8 ounces of dinitrocresol per 100 gallons killed 36.8 per cent of the buds. Sprays containing 2,4-dichloro-6-nitro-phenol at 8 ounces and 3 gallons of the oil per 100 gallons of mixture, killed only 0.5 per cent of the buds. No injury was observed for the mixture containing 3 gallons of oil and 4 ounces of the 2,4-dichloro-6-nitro-phenol per 100 gallons. A control determination with 3 gallons of the oil alone per 100 gallons of spray was found to cause a mortality of 1.1 per cent of sprayed buds.

Other chloro-mononitro-phenols and salts thereof which may be employed substantially as described in the foregoing examples, include 2,6-dichloro-4-nitro-phenol, 2-methyl-4-nitro-6-chloro-phenol, 2-chloro-4-methyl-6-nitro-phenol, 2-secondarybutyl-4-chloro-6-nitro-phenol, 2-normalhexyl-4-nitro-6-chloro-phenol, 2-tertiaryoctyl-4-nitro-6-chloro-phenol, 2-chloro-4-isopropyl-6-nitro-phenol, 2-cyclohexyl-4-nitro-6-chloro-phenol, 2-cyclohexyl-4-chloro-6-nitro-phenol, 2-chloro-4-cyclohexyl-6-nitro-phenol, sodium 2-methyl-4-nitro-6-chloro-phenolate, calcium 2-cyclohexyl-4-chloro-6-nitro-phenolate, sodium 2-secondarybutyl-4-chloro-6-nitro-phenolate, potassium 2-chloro-4-isopropyl-6-nitro-phenolate, sodium 2-chloro-6-nitro-phenolate, potassium 2-chloro-4-nitro-phenolate, ammonium 2,4-dichloro-6-nitro-phenolate, lithium 2,6-dichloro-4-nitro-phenolate, barium 4-chloro-6-nitro-phenolate, calcium 2-chloro-4-nitro-phenolate, strontium 2-chloro-4-nitro-phenolate, etc. Similarly mixtures of two or more of the phenols and/or phenolates may be employed. In many compositions embodying an alkaline ingredient, the phenolic toxicant will be found as a mixture of the free phenol and of the corresponding metal phenolate. By reason of the variation in solubility characteristics between the phenolates and the free phenols, the regulation of the pH of oil-water emulsions will be found to control largely the distribution of the phenolic toxicant as between the two phases of the dispersion.

We claim:

1. An ovicidal composition for application to living trees including a dormant spray oil and as an active toxicant a compound having the formula

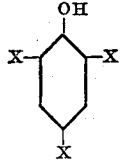

wherein one X represents a nitro radical, another X represents chlorine, and the third X is selected from the group consisting of chlorine, alkyl, cyclohexyl, and hydrogen.

2. An ovicidal composition for application to living trees consisting of an aqueous emulsion of a dormant spray oil, including as an active toxicant a compound having the formula

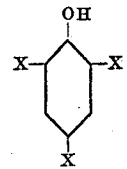

wherein one X represents a nitro radical, another X represents chlorine, and the third X is selected from the group consisting of chlorine, alkyl, cyclohexyl, and hydrogen.

3. An ovicidal composition for application to living trees including an aqueous emulsion of a mixture of a dormant spray oil, partially neutralized sulfonated sperm oil, and a compound having the formula

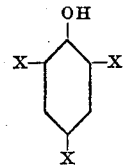

wherein one X represents a nitro radical, another X represents chlorine, and the third X is selected from the group consisting of chlorine, alkyl, cyclohexyl, and hydrogen.

4. An ovicidal composition for application to living trees including as an active toxicant 2-nitro-4,6-dichloro-phenol and a carrier therefor.

5. An insecticidal composition for application to living trees during the dormant period, including as an active toxicant a compound having the formula

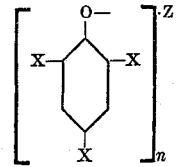

wherein one X represents a nitro radical, another X represents chlorine, the third X is selected from the group consisting of chlorine, alkyl, cyclohexyl, and hydrogen, Z is selected from the group consisting of hydrogen and cations of the class of the alkali and alkaline earth metals, and $n$ is an integer equal to the valency of Z, and a carrier therefor.

6. An insecticidal composition for application to living trees during the dormant period consisting of an aqueous spray composition, including at least 0.25 pound of a mono-nitro-chlorophenolic compound per 100 gallons, such compound having the formula

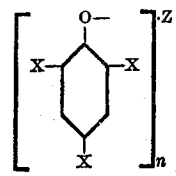

wherein one X represents a nitro radical, another X represents chlorine, the third X is selected from the group consisting of chlorine, alkyl, cyclohexyl, and hydrogen, Z is selected from the group consisting of hydrogen and cations of the class of the alkali and alkaline earth metals, and $n$ is an integer equal to the valency of Z.

FRED W. FLETCHER.
EUGENE E. KENAGA.